INVENTOR.
Meyer Colb
BY Richards & Geier
ATTORNEYS

2,985,167
GUM MASSAGING DEVICE

Meyer Colb, 652 E. 54th St., Brooklyn, N.Y.

Filed July 16, 1959, Ser. No. 827,534

2 Claims. (Cl. 128—62)

This invention relates to a gum massaging device and is particularly useful for massaging human gums.

Prior art gum massagers include those having roller members which roll over the teeth and gums and which give very little massaging value and which are very difficult, if not impossible, to utilize on the back lateral gum surfaces. These devices are very difficult to manipulate in the mouth because of the structure inherent in the roller construction. Other prior art gum massagers have spherical applicators which are inefficient since they are in contact with the gums only over a very small area.

An object of the present invention is to provide a gum massager not having the disadvantages of prior art.

Another object is the provision of a gum massager which massages the entire exposed gum over the entire vertical area of the gum.

Another object is the provision of a gum massager which massages large areas at one time.

Another object is the provision of a gum massager which bridges the spaces resulting from missing teeth.

Another object is the provision of a gum massager which simultaneously massages the front and back lateral sides of the gums.

Another object is the provision of a gum massager which massages without irritating gums or adjacent tissues and which is adaptable for all gums and all mouths.

A further object is the provision of a gum massager which takes up very little room and which is easy to construct and which is easily used.

Other objects of the present invention will become apparent in the course of the following specification.

The objects of the present invention may be realized through the provision of a gum massaging device having an adjustable handle and holder portion which holds a plurality of flexible massaging members. The device is constructed in such a manner that the flexible massaging members simultaneously massage opposite sides of the gums and the device may be so adjusted as to effect massaging simultaneously over large areas of the gums regardless of the size or construction of the individual gums being massaged.

The invention will appear more clearly from the following detailed description when taken in connection with the accompanying drawing showing, by way of example, a preferred embodiment of the inventive idea.

Figure 1:
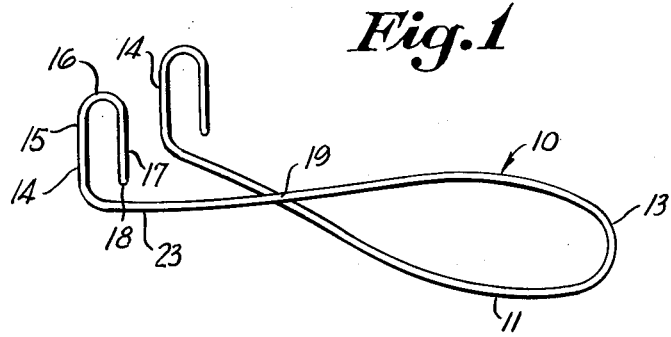
Figure 1 is a perspective view of the gum massaging device of the present invention showing the handle and holder portion.
Figure 3:
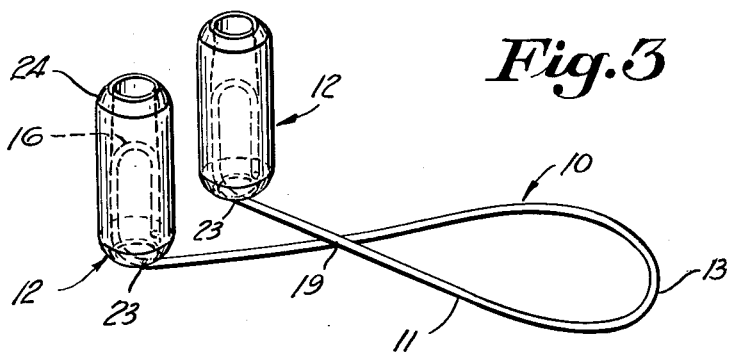
Figure 3 is a perspective view of the present invention with the massaging members securely mounted on the holder portion.

The gum massaging device 10 of the present invention is shown in Figure 3, and comprises a handle portion 11 and flexible massaging members 12. The handle portion 11 as may be seen in Figure 1, comprises a single substantially cylindrical elongated piece of metal which is shaped so as to form an oval grip portion 13 intermediate its length, and holder portions 14 in the vicinity of its end regions. The oval grip portion 13 lies in a single plane while the holder portions 14 lie in planes normal to the plane of the oval grip portion 13. A holder portion 14 comprises a straight portion 15 substantially perpendicular to the plane of the oval grip portion 13, a rounded portion 16, and a downwardly extending substantially straight portion 17 whose end 18 is remote from the plane of the oval grip portion 13. The oval grip portion 13 is bent so that the end regions cross each other at point 19. The two holder portions 14 are adjacent one another and may be brought together or separated by applying lateral pressure on the oval portion 13.

Figure 2:
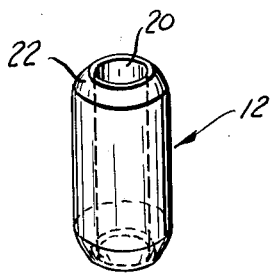
Figure 2 is a perspective view of the flexible massaging member of the present invention.

A flexible massaging member 12 is shown in Figure 2 and comprises a single elongated cylindrical member made of latex, plastic or similar material which will glide over the teeth and gums. A longitudinal hole 20 runs the entire length of the flexible massaging member 12. At each end adjacent to the hole is a convex region 22. The massaging device 10 is made usable by mounting the flexible members 12 on the holder portions 14 and moving the flexible massaging members 12 downwardly until they contact the holder portion 11 in the region 23. The hole 20 is made slightly smaller than the distance between portions 15 and 17 of the holder portion 14, so that the flexible member 12 will elastically stretch when it is placed on the holder 14. The downwardly extending holder portion 17 has a free end 18 which is remote from point 23. Therefore, as the flexible tip 12 is placed on the holder 14 and forced into contact with region 23, the portion of the flexible massaging member 12 which lies between the free end 18 and region 23 will elastically tend to contract to its original shape, whereby the flexible massaging member 12 is securely held on the holder portion 14 below the free end 18.

It should also be noted that the rounded portion 16 is remote from the upper end of the flexible massaging member 12 as may be clearly seen from Figure 3.

The gum massaging device 10 may be easily adjusted for different mouths by using a small pair of round-nosed pliers. The flat part of the pliers may be used for squeezing the end of the oval grip portion 13 for decreasing the distance between the flexible massaging members 12 and the round part of the pliers may be used for increasing the distance between the flexible massaging members 12 by squeezing longitudinally at the intersection point 19 of the overlapping portions of the handle 11.

The manner of use and operation of the gum massaging device 10 is as follows:

The device 10 is placed in the mouth with the flexible massaging members 12 pointed upward for massaging the upper jaw or pointed downward for massaging the lower jaw. One of the flexible massaging members 12 is placed behind the gum and the other is placed in front of the gum. Since the flexible member 12 is resilient, and since the holder portions 14 form planes between the portions 15 and 17 which are parallel to one another, the flexible member 12 becomes somewhat flattened in a direction through portions 15 and 17. Thus, the flexible member 12 contacts the gums over a relatively large area effecting a massaging action as the device is drawn along the gums. The device 10 should be so adjusted, as explained above, that the distance between the flexible members 12 is slightly less than the width of the gums being massaged. The operator's fingers are placed on the oval grip portion 13 and this makes it possible to move the flexible members 12 back and forth on the gums in a continuous motion, and thus both sides of the gums are simultaneously massaged.

Since the flexible members 12 are made of soft material, and since the metal handle portion is either exterior to the mouth or disposed within the members 12, no metal contact is made with the gums and no injurious effects can result. The construction of the device 10 is very light and is quite small and, therefore, takes up very little room in the mouth and is comfortable to use. The construction of the device 10 also allows for easy spreading of the instrument while in use, and the flattened massaging member 12 allows the device 10 to be manipulated across spaces left by the loss of a tooth. The shape of the holder portion 14 inside the member 12 is flat so as to provide a concave surface over the tooth and gum area where the member 12 is forced inwardly between portions 15, 16 and 17 by the force of contact with the gums.

Because the holder portion 14 is recessed in the member 12, the end regions 24 of the member 12 are cylindrical and give better contact on both sides of the gums where the gums join the rest of the mouth.

Since the hole 20 runs entirely through the flexible members 12, the instrument may be thoroughly washed with tap water without removing the members 12 from the holder portions 14.

Among the advantages of the gum massaging device of the present invention are the following:

The gum massager massages an entire vertical area of a gum at one time; the massager makes contact with the gums over a large area; the device simultaneously massages both the front and back lateral sides of the gums; the massager will bridge a space left by the loss of one or several teeth; the massager massages without irritating gums or adjacent tissues and without causing injury to the teeth or mouth; the massager is adaptable for all mouths; the massager is small, light and easily handled; and the massager is inexpensive and easy to manufacture.

It is apparent that the described example is capable of many variations and modifications within the scope of the present invention. All such variations and modifications are to be included within the scope of the present invention.

What is claimed is:

1. A gum massaging device, comprising a wire handle portion, said handle portion comprising a resilient oval-shaped grip portion lying in one plane and having two overlapping end regions, and two adjacent holder portions each one connected to one of said end regions and each lying in a plane normal to the plane of the grip portion; each of said holder portions comprising a first straight portion connected to said end region, a substantially semi-circular rounded portion connected to said first straight portion, and a second straight portion parallel to said first straight portion and connected to said rounded portion and having a free end extending toward and remote from said plane of said grip portion; and a substantially cylindrical elongated flexible massaging member having a longitudinal hole mounted on each of said holder portions, each of said holder portions being disposed in one of said holes, and being wider than said hole, whereby said massaging member is resiliently stretched, said massaging member being partially disposed in the region between the free end of said second straight portion and said grip portion, whereby said massaging member tends to contract and assumes its original shape and is resiliently and securely held on said holder portion, a portion of said massaging member extending above said holder portion.

2. A gum massaging device, comprising a handle portion, two adjacent holder portions each one connected to said handle portion and each lying in a plane normal to the plane of said handle portion; each of said holder portions comprising a first straight portion being connected to said handle portion, a substantially semi-circular rounded portion connected to said first straight portion, and a second straight portion parallel to said first straight portion and connected to said rounded portion and having a free end extending toward and remote from said handle portion; and a substantially cylindrical elongated flexible massaging member having a longitudinal hole mounted on each of said holder portions, each of said holder portions being disposed in one of said holes, and being wider than said hole, whereby said massaging member is resiliently stretched, said massaging member being partially disposed in the region between the free end of said second straight portion and said handle portion, whereby said massaging member tends to contract and assume its original shape and is resiliently and securely held on said holder portion, a portion of said massaging member extending above said holder portion.

References Cited in the file of this patent

FOREIGN PATENTS 169,217  Great Britain _____ Sept. 9, 1921